United States Patent [19]

Cable et al.

[11] 4,456,228

[45] Jun. 26, 1984

[54] RADIUS ATTACHMENT FOR AUTOMATED WELDING AND CUTTING TORCH CARRIAGES

[75] Inventors: Harold E. Cable; Anil N. Rodrigues, both of Pittsburgh, Pa.

[73] Assignee: Weld Tooling Corporation, Pittsburgh, Pa.

[21] Appl. No.: 428,258

[22] Filed: Sep. 29, 1982

[51] Int. Cl.³ .............................................. B23K 7/10
[52] U.S. Cl. ........................................ 266/70; 266/73
[58] Field of Search ........................ 266/70, 67, 73, 77

[56] References Cited

U.S. PATENT DOCUMENTS

| D. 255,903 | 7/1980 | Cable | D15/139 |
|---|---|---|---|
| 2,183,605 | 12/1939 | Bucknam et al. | 266/70 |
| 2,548,302 | 4/1951 | Gilson | 266/70 |
| 2,705,629 | 4/1955 | Miller | 266/56 |
| 3,485,306 | 12/1969 | Gulley | 173/32 |
| 3,515,844 | 1/1969 | Colarossi et al. | 219/125 |
| 4,241,664 | 12/1980 | Cable | 104/118 |

*Primary Examiner*—W. Stallard
*Attorney, Agent, or Firm*—Buell, Blenko, Ziesenheim & Beck

[57] ABSTRACT

A radius attachment is provided for use with a conventional welding or cutting torch carriage incorporating a segment of the guide rail carrying a drive means and balancing means, the drive means being driven by the drive of the torch carriage and a connection from the guide rail segment to a pivot point adjustably controlling the radius of rotation.

5 Claims, 5 Drawing Figures

RADIUS ATTACHMENT FOR AUTOMATED WELDING AND CUTTING TORCH CARRIAGES

This invention relates to a radius attachment for automated welding and cutting torch carriages and particularly to a radius attachment for use with welding and cutting torch carriages of the type used on rails to cut along the length of the rail and to drive along the rail by means of a gear engaging a rack on the rail.

There are a large number of track and carriage systems for automated welders and/or cutters which are based upon the use of a rail carrying a drive rack and a carriage traveling on the rail with guide wheels engaging the track to hold the carriage positioned thereon relative to the rack and a pinion driven by a motor on the carriage engaging the rack to move the carriage there along. Such systems are limited to use only on a line or plane formed by the rail in a generally longitudinal path.

There are many instances where it would be desirable to use such automated carriages to cut or weld a circle or like radius. Unfortunately the conventional track cannot be bent to form such radius cuts or welds.

The present invention provides an apparatus which permits such track operated welding and cutting carriages to cut any desired radius. The invention is based upon the use of a segment of rail without a drive rack, sufficiently long to be engaged by the carriage wheels and mounted as a part of an adjustable radius arm which is fixed adjacent one end to a pivot. The carriage rail segment is provided with a drive wheel whose axis is on the pivot axis and driven by the carriage drive and with an idler caster wheel for stability.

Preferably we provide a radius attachment for use with a welding or cutting torch carriage having wheels adapted to engage a guide rail and a drive means normally engaging a drive rack on said rail which comprises a guide rail segment without a drive rack receiving said welding or cutting torch, carriage, means on said guide rail segment fixing said torch carriage in position thereon, a pivot means adapted to be fixed on a work piece, means connecting said rail segment to said pivot means, drive means on said guide rail following a line tangential to the radius of rotation of the guide rail engaged by and driven from the drive means of the torch carriage and balance wheel means on the guide rail segment spaced from the drive means. Preferably the guide rail segment is attached to one end of an elongate rod whose other end is pivoted on the pivot means. Alternatively, the guide rail segment may itself be pivoted at one end on the pivot means with the torch carriage fixed to the opposite end. The pivot means is preferably a pivot pin adapted to be inserted in a guide hole in the work piece and surrounded by a magnetic block to stablize said pin. Preferably the drive means on the guide rail segment is a drive wheel whose axis lies on the radius and which is driven by a gear box on the guide rail segment engaging the drive means on the torch carriage.

In the foregoing general description we have set out certain objects, purposes and advantages of this invention. Other objects, purposes and advantages of this invention will be apparent from a consideration of the following description and the accompanying drawing in which.

Figure 1:
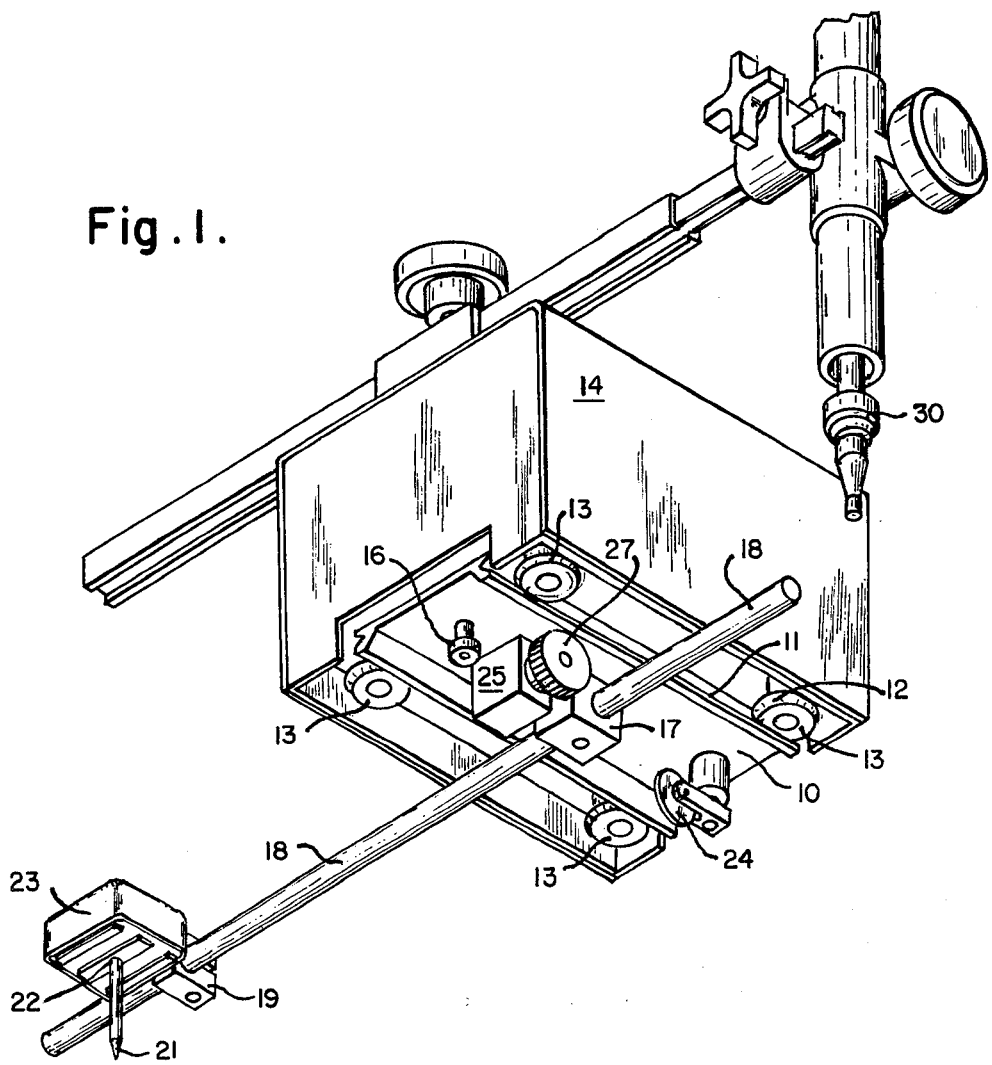
FIG. 1 is a bottom isometric view of an apparatus according to this invention.
Figure 2:
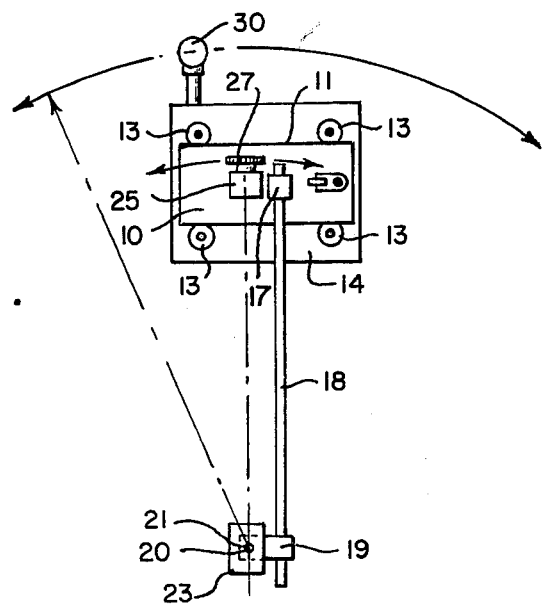
FIG. 2 is a top plan view of the apparatus of FIG. 1.

Referring to the drawings we have illustrated a guide rail section 10 of one conventional shape having guide and support wheel grooves 11 along each side engaged by the beveled rim 12 of support wheels 13 on one form of conventional torch carriage 14. The guide rail section 10 is formed without the drive rack which normally is found on the upper surface of the rail and is normally engaged by drive pinion 15 of the torch carriage 14. Drive pinion 15 is here used to drive a pinion 26 hereafter described. A lock screw 16 is provided in rail segment 10 to engage and hold carriage 14 in fixed position on the rail segment. The bottom of the rail segment, opposite the torch carriage 14, is provided with a fastening block 17 engaging one end of a radius arm 18. The other end of arm 18 is fixed in one end of a link 19 which is provided with a pivot hole 20 in the opposite end, pivotally engaged on a pivot pin 21 which passes through a hole 22 in a magnetic stabilizer block 23. The bottom side of the guide rail segment is also provided with a pivoting balance or idler caster wheel 24 and a gear box 25. Gear box 25 is provided with a vertical shaft having a pinion 26 engaging the drive gear pinion 15 of the torch carriage and with a drive wheel 27 which engages the work piece and is driven from pinion 15 through the gear box 25. The carriage 14 carries an adjustable torch 30 of conventional form and arrangement.

Figure 5:
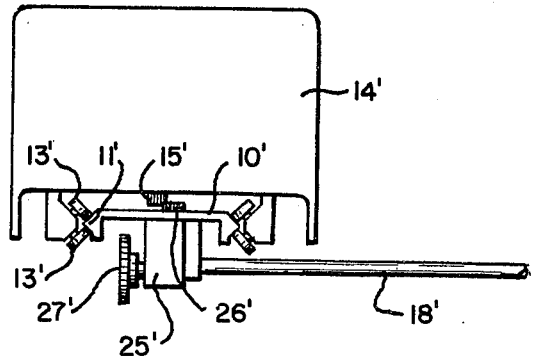
FIG. 5 is an end elevational view of an alternative drive arrangement.

In the form of rail segment and torch carriage illustrated in FIG. 5, we have shown another conventional guide rail and wheel combination in which paired wheels 13' are angled and engage a bevel edge 11'. The pinion gear 15' engages a gear 26' from the gear box as in the other embodiments.

Figure 3:
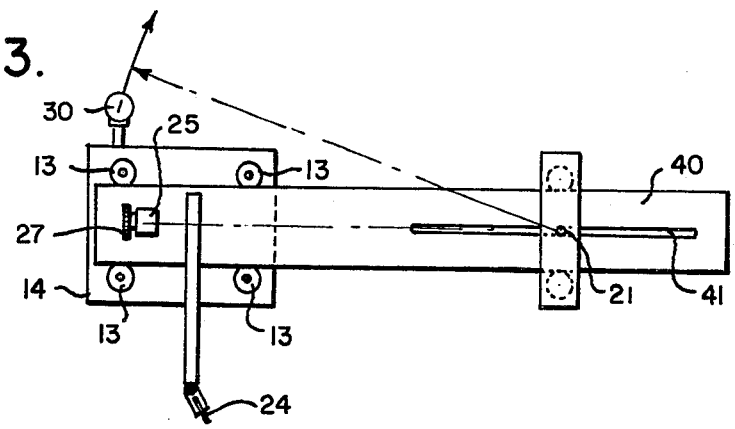
FIG. 3 is a top plan view of a second embodiment of the invention.
Figure 4:
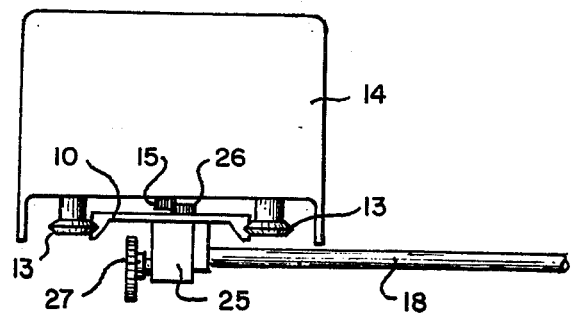
FIG. 4 is an end elevational view of drive arrangement of FIG. 1.

In the modification illustrated in FIG. 3, we have illustrated a form of the invention in which the guide rail segment 40 is provided at one end with an adjustable pivot opening 41 adapted to pivot on pin 21. All other parts of the apparatus remain the same, the drive wheel being turned 90° to remain on a drive line tangential to the radius.

In the foregoing specification we have set out certain preferred practices and embodiments of our invention, however, it will be understood that this invention may be otherwise embodied within the scope of the following claims.

We claim:

1. A radius attachment for use with a welding or cutting torch carriage having wheels adapted to engage a guide rail and a drive means normally engaging a drive rack on said rail comprising a guide rail segment without a drive rack receiving said welding or cutting torch carriage, means on said guide rail segment fixing said torch carriage in position thereon, a pivot means adapted to be fixed on a work piece, means adjustably connecting said rail segment to said pivot means, drive means on said guide rail following a line tangential to the radius of rotation of the guide rail engaged by and driven from the drive means of the torch carriage and balance wheel means on said guide rail segment spaced from the drive means.

2. A radius attachment as claimed in claim 1 wherein the guide rail segment is attached to one end of an elongate rod whose other end is pivoted on the pivot means.

3. A radius attachment as claimed in claim 1 wherein one end of the guide rail segment is pivoted on the pivot means and the torch carriage is fixed to the other end.

4. A radius attachment as claimed in claim 1 or 2 or 3 wherein the pivot means is a vertical pin inserted through a hole in a magnetic stabilizer block.

5. A radius attachment as claimed in claim 1 or 2 or 3 wherein the drive means is a drive wheel whose axis lies on the radius and is driven by a gear box on the guide rail segment engaging the drive means on the torch carriage.

* * * * *